US008473918B2

(12) United States Patent
Acedo et al.

(10) Patent No.: US 8,473,918 B2
(45) Date of Patent: Jun. 25, 2013

(54) METHOD FOR SINGLETON PROCESS CONTROL

(75) Inventors: Mario Francisco Acedo, Tucson, AZ (US); Ezequiel Cervantes, Tucson, AZ (US); Paul Anthony Jennas, II, Tucson, AZ (US); Jason Lee Peipelman, Vail, AZ (US); Matthew John Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 1296 days.

(21) Appl. No.: 12/017,230

(22) Filed: Jan. 21, 2008

(65) Prior Publication Data

US 2009/0187888 A1    Jul. 23, 2009

(51) Int. Cl.
*G06F 9/44* (2006.01)
(52) U.S. Cl.
USPC ........................................ 717/127
(58) Field of Classification Search
USPC ........................................ 717/127
See application file for complete search history.

(56) References Cited

U.S. PATENT DOCUMENTS

| 6,101,328 | A  |   8/2000 | Bakashi et al. |
| 6,314,567 | B1 | 11/2001 | Oberhauser et al. |
| 6,647,508 | B2 | 11/2003 | Zalewski et al. |
| 6,704,806 | B1 * |  3/2004 | Decker .................... 719/324 |
| 6,917,963 | B1 |  7/2005 | Hipp et al. |

OTHER PUBLICATIONS libASSA Programmer's Manuel, v 1.2 Jul. 15, 2003, http://libassa.sourceforge.net/libassa-manual/C/book1.html chapter 1.5 http://libassa.sourceforge.net/libassa-manual/C/x274.html chapter 4.15 http://libassa.sourceforge.net/libassa-manual/C/x3032.html.*
Learning the Korn Shells, First Edition, Jun. 1993, http://docstore.mik.ua/orelly/unix/ksh/index.htm.*
Stevens, "Advanced Programming in the Unix Environment", Addison-Wesley, Second Edition, 2005, p. 211-212, 215-216, 423, 432-434.*

* cited by examiner

*Primary Examiner* — Li B Zhen
*Assistant Examiner* — Duy Khuong Nguyen
(74) *Attorney, Agent, or Firm* — Griffiths & Seaton PLLC

(57) ABSTRACT

A method for singleton process control in a computer environment is provided. A process identification (PID) for a background process is stored in a first temporary file. The PID is stored by a parent process and subsequently accessed by the background process. The background process is exited if an active PID is determined to exist in a second, global temporary file. The PID from the first temporary file is stored into the second, global temporary file. A singleton code block is then executed.

14 Claims, 2 Drawing Sheets

METHOD FOR SINGLETON PROCESS CONTROL

BACKGROUND OF THE INVENTION

1. Field of the Invention

The present invention relates in general to computers, and more particularly to a method and computer program product for singleton process control in a computer environment.

2. Description of the Related Art

Computers and computer environments are commonplace in today's society. Computers and computer systems may be found at home, at school, and at the workplace. In a variety of settings, computers execute programs to accomplish varied functionality. In some cases, a startup script, a set of instructions apart from the computer program itself, may be executed to start the computer programs.

In many cases it may be desirable for one instance of such computer programs (i.e., a singleton computer process) to be executing at a single time. However, in view of current programming constraints and platforms, it may be difficult to determine if a single computer program is running at any one particular time and further, to maintain and ensure such a singleton process in a computer environment.

SUMMARY OF THE INVENTION

A need exists for a method and computer program product for singleton process control. Accordingly, in one embodiment, by way of example only, a method for singleton process control in a computer environment is provided. A process identification (PID) for a background process is stored in a first temporary file. The PID is stored by a parent process and subsequently accessed by the background process. The background process is exited if an active PID is determined to exist in a second, global temporary file. The PID from the first temporary file is stored into the second, global temporary file. A singleton code block is then executed.

In another embodiment, again by way of example only, a computer program product for singleton process control in a computer environment is provided. The computer program product comprises a computer-readable storage medium having computer-readable program code portions stored therein. The computer-readable program code portions include a first executable portion for storing a process identification (PID) for a background process in a first temporary file, the PID stored by a parent process and subsequently accessed by the background process, a second executable portion for exiting the background process if an active PID is determined to exist in a second, global temporary file, a third executable portion for storing the PID from the first temporary file into the second, global temporary file, and a fourth executable portion for executing a singleton code block.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
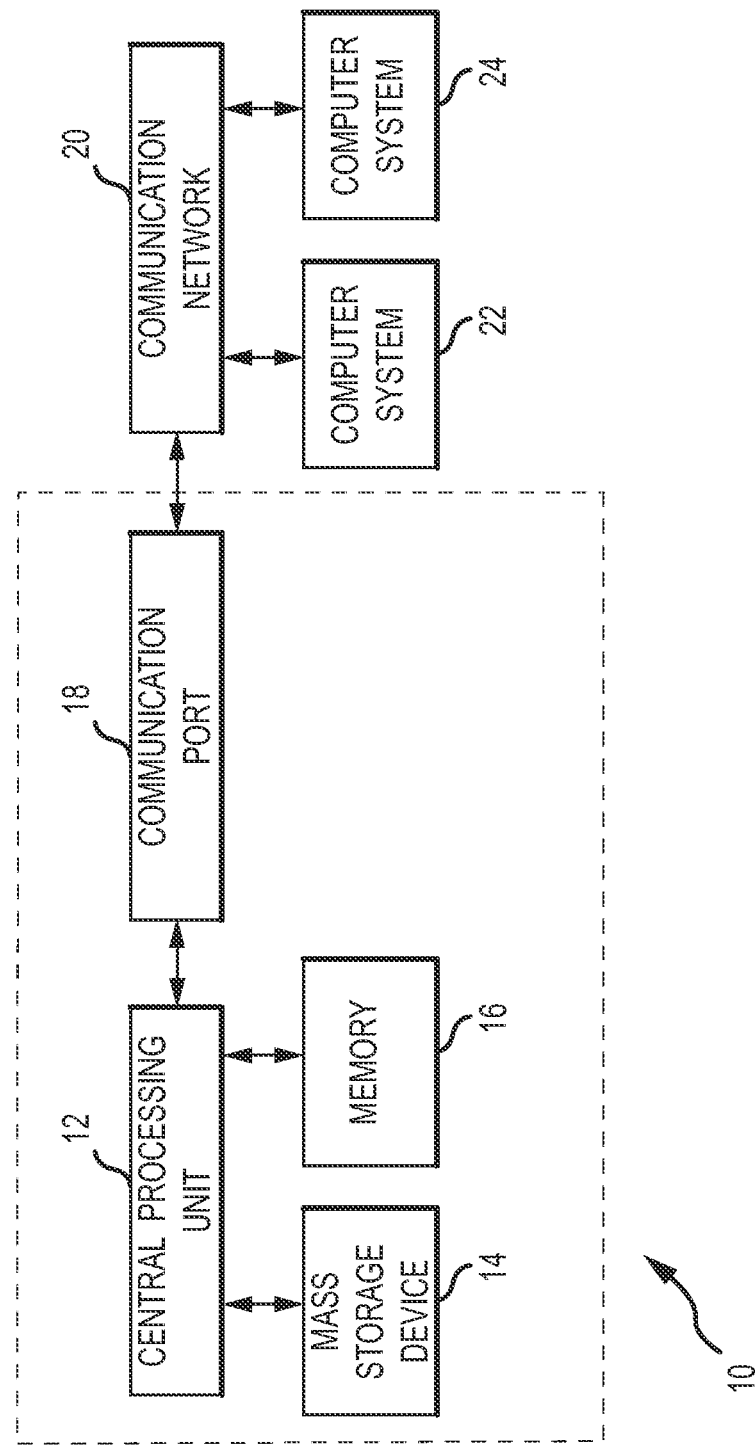
FIG. 1 depicts one embodiment of a computing environment to incorporate and use one or more aspects of the claimed subject matter.

Turning to FIG. 1, an exemplary computing environment 10 is depicted capable of incorporating and using one or more aspects of the following claimed subject matter. As one skilled in the art will appreciate, however, the depicted exemplary embodiment is only one representation of a variety of configurations in which one or more aspects of the claimed subject matter may be implemented.

Environment 10 includes a central processing unit (CPU) 12 which may execute portions of computer instructions or scripts. CPU 12 is connected to a mass storage device 14 such as a hard disk drive (HDD) or a similar component. CPU 12 is also connected to a memory 16 such as a non-volatile memory, for example, one or more EEPROMs (Electrically Eraseable Programmable Read Only Memory), one or more flash PROMs (Programmable Read Only Memory), battery backup RAM, combinations thereof, and the like.

CPU 12 is coupled through a communication port 18 to a communication network 20 such as an Ethernet LAN (Local Area Network) or WAN (Wide Area Network). Communication network may include wireless components compatible with one or more wireless specifications, such as an IEEE 802.xx, WiMAX, or an equivalent standard. Finally, remote computer systems 22 and 24 are coupled to communication network 20. As one skilled in the art will appreciate, portions of computer programs, including the processes and scripts hereafter described, may execute on portions of environment 10, computer systems 22 and 24, or elsewhere.

As previously described, in many cases a startup script may be provided to wrap the actual call to start a particular computer program. The user calls this startup script to indirectly start the desired program rather than directly executing the program itself. A programmer may implement such a startup "wrapper" script for a variety of reasons. For example, the call to start the program may be complicated, and the programmer may not want the user to be forced to enter static parameters each time the computer program starts. In another example, the programmer may want to perform checks or set up variables in a shell script before launching the program.

In many cases, the wrapper script will make its calls in the background (i.e., a child process) so that the script will return the operating system (OS) prompt back to the user. Frequently, the programmer will only want one instance of the program to be run at any given time. This single instance refers to the singleton program or singleton process previously described. A typical solution in a UNIX or Linux environment involves issuing a "ps -eaf| grep programName" command to the OS to see if a program with the given name is already running. If the program is shown to be running, then the user does not restart the program. However, some programs could have duplicate names, or even more likely, a log file may have the same name. As a result, if a program name is changed, the accompanying wrapper script must also be changed.

A possible solution may be to store the process identification (PID) of the script in a file and check for the PID to be active before starting the program. Currently, however, such a PID may be difficult to obtain in many cases. For example, a PID, particularly a PID of a child process spawned by a parent wrapper script used to start a program, is difficult to obtain using commonly used JAVA and AIX programming.

The present description and following claimed subject matter address the difficulties in obtaining PIDs of scripts to maintain and ensure singleton process control. In one embodiment, for example, the PID of the child process (wrapper script) is stored in a global temporary file. The PID is then checked to see if it is active before the program is started for a second time/instance. The PID of the child process is obtained and stored in a second temporary file. By using the PIDs of processes and not using program names, a wrapper script can return a prompt to the user as it makes calls to start a particular program in the background (as the parent process "dies"), and yet, ensure that only one instance of the associated program will be started.

Figure 2:
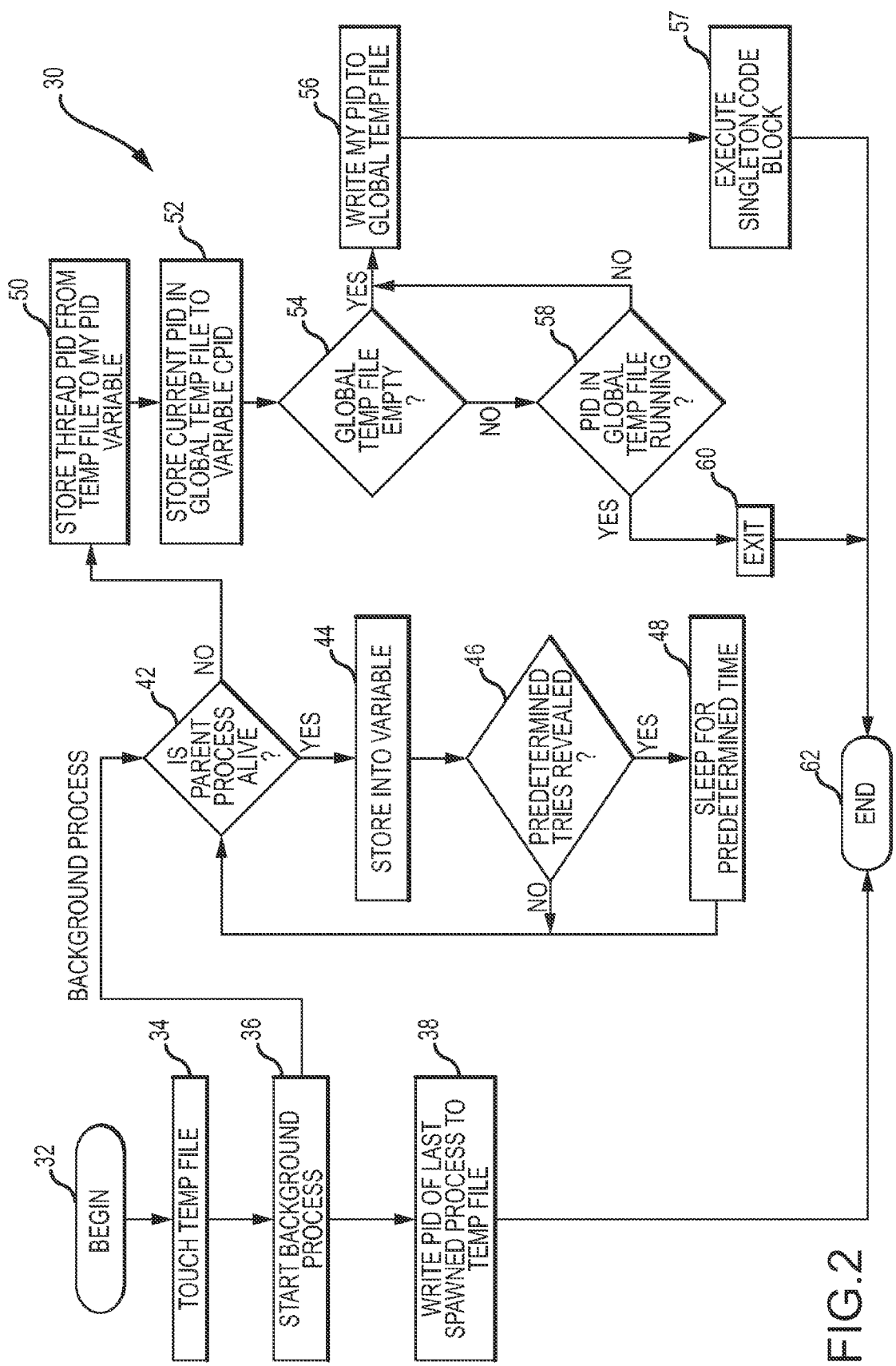
FIG. 2 depicts an exemplary method for implementing singleton process control in a computer environment such as the environment depicted in FIG. 1.

FIG. 2 depicts an exemplary method 30 of implementing singleton process control in a computer environment, using an exemplary wrapper script. As one skilled in the art will appreciate, various steps in the method may be implemented in differing ways to suit a particular application. In addition, the described method may be implemented by various means, such as hardware, software, firmware, or a combination thereof operational on or otherwise associated with the computer environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 30 begins (step 32) by the creation of a temporary file (touch file) (step 34). This temporary file will eventually store the PID of the child process (wrapper script). As a next step, the call function to start the child process is issued, and the background process is started (step 36). The PID of the last spawned process, in this case the child process/wrapper script is written to the temporary file (step 38). The parent process eventually "dies" as the parent process associated with method 30 ends (step 62).

As a next step, a background process variable is initialized to keep track of a number of tries in which the parent process is checked to determine if the parent process is active ("alive"). Method 30 then queries whether the parent process remains active (step 42). If yes, the method 30 stores into the background process variable (step 44). If a predetermined number of tries is not yet reached, the method 30 continues to query whether the parent process is active (again, step 42). If so, the method 30 again stores into the background process variable (again, step 44) until the predetermined number of tries is reached (step 46). In that case, the method 30 instructs the loop to sleep for a predetermined time (step 48). The method 30 then returns to step 42 to again query if the parent process remains active.

Once it is determined that the parent process is no longer active, the PID of the child process is written from the temporary file into a first PID variable (e.g., MYPID) (step 50). The method then checks a global temporary file (previously created) to write the existing PID into a second PID variable (e.g., CPID) (step 52). If the global temporary file is empty (step 54), then it may be determined that the program associated with the child process is being started for the first time. The PID of the child process (and eventually, the PID of the started program) is then written to the global temporary file (step 56).

If it is determined that the global temporary file is not empty (again, step 54), the method 30 then checks to see if the PID associated with the global temporary file is active (running). If so, the method exits the process associated with the global temporary file's PID (step 60) and the method 30 ends (step 62). If no, then the child PID is written to the global temporary file (again, step 56). Since it is determined that the associated process is not already running, a singleton code block is executed (step 57), and the method 30 ends (again, step 62).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for singleton process control in a computer environment, comprising:
storing a process identification (PID) of a last spawned process for a background process in a first temporary file, the PID stored by a parent process, and subsequently accessed by the background process that is initialized;
initializing a background process variable for keeping track of a predetermined number of tries the parent process is checked to determine if the parent process is alive;
determining if the parent process is alive for the predetermined number of tries, wherein a PID of the background process is written from the first temporary file into a first PID variable when the parent process ends;
storing into the background process variable for so long as the parent process is active;
determining whether a second, global temporary file is empty, wherein:
if the global temporary file is empty:
commencing for a first time an associated program with the PID of the background process if a second, global temporary file is empty, and
storing the PID of the background process from the first temporary file into the second, global temporary file, and
if the global temporary file is not empty:
determining if an existing PID stored within the second, global temporary file is active, wherein
if the existing PID is determined to be active in the second, global temporary file, exiting a process associated with the existing PID, and
if the existing PID is determined to be not active in the second, global temporary file, storing the PID of the background process from the first temporary file into the second, global temporary file;
writing the existing PID to a second PID variable; and
executing a singleton code block.

2. The method of claim 1, further including creating the first temporary file.

3. The method of claim 2, further including creating the second, global temporary file.

4. The method of claim 3, further including starting the background process.

5. The method of claim 1, further including if the predetermined number of tries is reached:

sleeping for a predetermined time, and
redetermining if the parent process is alive for the predetermined number of tries.

6. The method of claim 1, further including issuing a call function to issue the PID for the background process.

7. The method of claim 1, further including ensuring only one instance of the associated program is started by using the PID of the background process and not using program names, wherein a wrapper script returns a prompt to a user as calls to start a program as the parent process dies.

8. A computer program product for singleton process control in a computer
environment, the computer program product comprising a non-transitory computer-readable
storage medium having computer-readable program code portions stored therein, the computer-readable program code portions comprising:
a first executable portion that stores a process identification (PID) of a last spawned
process for a background process in a first temporary file, the PID stored by a parent process, and subsequently accessed by the background process that is initialized;
a second executable portion that initializes a background process variable for keeping
track of a predetermined number of tries the parent process is checked to determine if the parent process is alive;
a third executable portion that determines if the parent process is alive for the
predetermined number of tries, wherein a PID of the background process is written from the
first temporary file into a first PID variable when the parent process ends;
a fourth executable portion that stores into the background process variable for so long as the parent process is active;
a fifth executable portion that determines whether a second, global temporary file is
empty, wherein:
if the global temporary file is empty:
commencing for a first time an associated program with the PID of the background process if a second, global temporary file is empty, and
storing the PID of the background process from the first temporary file
into the second, global temporary file;
if the global temporary file is not empty:
determining if an existing PID stored within the second, global temporary file is active, wherein:
if the existing PID is determined to be active in the second, global temporary file, exiting a process associated with the existing PID, and
if the existing PID is determined to be not active in the second, global temporary file, storing the PID of the background process from the first temporary file into the
second, global temporary file;
a sixth executable portion that writes the existing PID to a second PID variable; and
a seventh executable portion that executes a singleton code block.

9. The computer program product of claim 8, further including an eighth executable portion that ensures only one instance of the associated program is started by using the PID of the background process and not using program names, wherein a wrapper script returns a prompt to a user as calls to start a program as the parent process dies.

10. The computer program product of claim 8, further including a ninth executable portion that creates the first temporary file.

11. The computer program product of claim 10, further including a tenth executable portion that creates the second, global temporary file.

12. The computer program product of claim 11, further including an eleventh executable portion that starts the background process.

13. The computer program product of claim 12, further including if the predetermined number of tries is reached:
a twelfth executable portion that sleeps for a predetermined time, and
a thirteenth executable portion that redetermines if the parent process is alive for the predetermined number of tries.

14. The computer program product of claim 8, further including a fourteenth executable portion for issuing a call function to issue the PID for the
background process.

* * * * *